(12) United States Patent
Scheuermann

(10) Patent No.: US 7,974,967 B2
(45) Date of Patent: Jul. 5, 2011

(54) HYBRID DATABASE SYSTEM USING RUNTIME RECONFIGURABLE HARDWARE

(75) Inventor: Bernd Scheuermann, Karlsruhe (DE)

(73) Assignee: SAP AG, Walldorf (DE)

( * ) Notice: Subject to any disclaimer, the term of this patent is extended or adjusted under 35 U.S.C. 154(b) by 577 days.

(21) Appl. No.: 12/103,426

(22) Filed: Apr. 15, 2008

(65) Prior Publication Data

US 2009/0259644 A1    Oct. 15, 2009

(51) Int. Cl.
G06F 17/30    (2006.01)
(52) U.S. Cl. ........ 707/713; 707/718; 707/719; 707/720; 707/999.002; 707/999.003
(58) Field of Classification Search .......... 707/999.002–999.003, 713, 718–719
See application file for complete search history.

(56) References Cited

U.S. PATENT DOCUMENTS

| | | | |
|---|---|---|---|
| 6,665,710 B1 * | 12/2003 | Bates et al. | 709/217 |
| 2003/0212668 A1 | 11/2003 | Hinshaw et al. | |
| 2005/0028134 A1 | 2/2005 | Zane et al. | |
| 2006/0101369 A1 * | 5/2006 | Wang et al. | 716/17 |

OTHER PUBLICATIONS

Extended European Search Report for EP Application No. 09005306.7, mailed Sep. 25, 2009, 10 pages.
"McObject releases eXtremeDB Fusion, a Hybrid Embedded Database", McObject Internet Publication (Feb. 5, 2007), 2 pages.
Scheuermann, Bernd "Ant Colony Optimization on Runtime Reconfigurable Architectures", Dissertation of Bernd Scheuermann, University of Fridericiana at Karlsruhe (2005).
Ahmadinia, Ali et al., "A Practical Approach for Circuit Routing on Dynamic Reconfigurable Devices", IEEE Proceedings of the 16th International Workshop on Rapid System Prototyping (2005).
Angermeier, Josef et al., "The Erlangen Slot Machine—A Platform for Interdisciplinary Research in Dynamically Reconfigurable Computing", Information Technology 49 (2007), pp. 143-148.
Gawlick, Dieter et al., "Varieties of Concurrency—Control in IMS/VS Fast Path", Tandem Technical Report 85.6 (Jun. 1985).
Lee, Inseon, et al., "A Fast Commit Protocol for Distributed Main Memory Database Systems", ICOIN 2002, LNCS 2344, pp. 691-702, (2002).
Lehman, Tobin J. et al., "A Recovery Algorithm for a High-Performance Memory-Resident Database System", ACM 0-89791-236-5/87/0005/0104, pp. 104-117 (1987).
Salem, Kenneth et al., "Altruistic Locking: A Strategy for Coping with Long Lived Transactions", Department of Computer Science, Princeton University, pp. 175-199 (1987).

(Continued)

*Primary Examiner* — Apu M Mofiz
*Assistant Examiner* — Monica M Pyo
(74) *Attorney, Agent, or Firm* — Brake Hughes Bellermann LLP

(57) ABSTRACT

A system may include a routines repository that is configured to store and maintain hardware libraries, software libraries and metadata, a hybrid query engine that may be configured to receive a query, parse the query, compute a query execution plan and output the query execution plan using metadata and operators from the hardware libraries and/or the software libraries, and a routines management module that may be configured to provide the metadata and the operators from the routines repository to the hybrid query engine. The system may include an execution engine module that may be configured to receive the query execution plan, the execution engine module including a reconfigurable hardware execution engine having a reconfigurable fabric, where the reconfigurable hardware execution engine may be configured to process the query execution plan.

13 Claims, 7 Drawing Sheets

OTHER PUBLICATIONS

Tham, K.S. et al., "Software-Oriented Approach to Hardware-Software Co-Simulation for FPGA-Based RISC Extensible Processor", Centre for High Performance Embedded Systems, Nanyang Technological University Singapore, IEEE (2006).

Todman, T.J. et al., "Reconfigurable Computing: Architectures, Design Methods, and Applications", IEEE Proceedings—Computers and Digital Techniques, vol. 152, Issue 2, pp. 193-207 (Mar. 2005).

Vikram, K.N. et al., "Hardware-Software Co-simulation of Bus-based Reconfigurable Systems", Department of Electrical Engineering, IIT Madras, Chennai, 600036 India (Jul. 17, 2004).

Office Action for EP Application No. 09005306.7, mailed Aug. 26, 2010, 4 pages.

Lemoine, et al, "Run Time Reconfiguration of FPGA for Scanning Genomic Databases", Proceedings of the IEEE Symposium on FPGAS for Custome Computing Machines, Apr. 19-21, 1995, pp. 90-98.

Office Action Response for EP Application No. 09005306.7, filed Dec. 9, 2010, 12 pages.

Office Action Response for EP Application No. 09005306.7, filed Dec. 4, 2009, 13 pages.

* cited by examiner

HYBRID DATABASE SYSTEM USING RUNTIME RECONFIGURABLE HARDWARE

TECHNICAL FIELD

This description relates to a hybrid database system using runtime reconfigurable hardware.

BACKGROUND

Database systems may use discs as permanent data storage. Such systems may be referred to as disc resident database systems (DRDBS). With the decreasing prices and higher densities of semiconductor technology, it may be attractive to store increasingly large databases into memory. Consequently, such main memory database systems (MMDBS) have gained a lot of popularity. It should be noted that DRDBS may not be restricted to the use of discs as the only storage media, neither may MMDBS be restricted to main memory. For example, DRDBS may use main memory for caching data access, whereas MMDBS may make use of disc storage for backup and logging purposes. One difference between both technologies is that in MMDBS, the primary database copy may be kept in memory, whereas in DRDBS, the primary copy may reside on disc. DRDBS may be optimized to handle the typical characteristics of the disc storage stack. MMDBS may achieve a higher transactional throughput and faster response time than the disc resident counterpart, by providing algorithms that may be optimized for high-speed access to memory data.

Due to the high-speed access and direct addressability of semiconductor memory, in MMDBS, data access may no longer be a primary factor determining throughput and response time. With the exception of commit processing, the performance of MMDBS may increasingly depend on computational power. Therefore, it may be desirable to seek a database system which accelerates the execution of database transactions.

SUMMARY

In one general aspect, a system may include a routines repository that is configured to store and maintain one or more hardware libraries, one or more software libraries and metadata, a hybrid query engine that may be configured to receive a query, parse the query, compute a query execution plan and output the query execution plan using the metadata and operators from at least one of the hardware libraries and the software libraries, and a routines management module that may be logically coupled to the routines repository and to the hybrid query engine and that may be configured to provide the metadata and the operators from the routine repository to the hybrid query engine. The system may include an execution engine module that may be logically coupled to the hybrid query engine and that may be configured to receive the query execution plan, the execution engine module including a reconfigurable hardware execution engine having a reconfigurable fabric, where the reconfigurable hardware execution engine may be configured to process the query execution plan.

Implementations may include one or more of the following features. For example, the hybrid query engine may include a parser that may be configured to receive the query and to check code related to the query for syntactical correctness, a rewriter that is configured to rewrite the query into a canonical form, and an optimizer that is configured to receive the canonical form and to generate the query execution plan. The hybrid query engine may be configured to partition the query execution plan into a first query execution plan and a second query execution plan and the execution engine module may further include a main memory execution engine, where the reconfigurable hardware execution engine may be arranged and configured to process the first query execution plan and the main memory execution engine may be arranged and configured to process the second query execution plan.

In one implementation, the hybrid query engine may be configured to partition the query execution plan into a first query execution plan and a second query execution plan and the execution engine module may further include a disc resident execution engine, where the reconfigurable hardware execution engine may be configured to process the first query execution plan and the disc resident execution engine may be configured to process the second query execution plan. In another implementation, the hybrid query engine may be configured to partition the query execution plan into a first query execution plan, a second query execution plan and a third query execution plan. The execution engine module may further include a main memory execution engine and a disc resident execution engine, where the reconfigurable hardware execution engine may be arranged and configured to process the first query execution plan, the main memory execution engine may be configured to process the second query execution plan and the disc resident execution engine may be configured to process the third query execution plan.

The hybrid query engine may include an optimizer that may be configured to generate a first query execution plan, the second query execution plan and the third query execution plan. The optimizer may include a cost estimator that is configured to assess a cost for alternative operators for the first query execution plan, the second query execution plan and the third query execution plan based on the metadata provided by the routines management module. The optimizer may include an execution planner that may be configured to construct a first query execution plan, the second query execution plan and the third query execution plan.

In one exemplary implementation, the system may include a storage management module that may be logically coupled to the hybrid query engine and to the execution engine module and that may be configured to interact with multiple storage resources and to optimize distribution of data between the execution engine module and the multiple storage resources. The system also may include a scheduler that may be logically coupled to the hybrid query engine, the execution engine module and the routines management module and that may be configured to receive the query execution plan and to schedule operations on the reconfigurable hardware execution engine, the main memory execution engine and the disc resident execution engine.

The system may include a communication management module that may be logically coupled to the execution engine module. The communication management module may be configured to coordinate communication with the reconfigurable hardware execution engine and the reconfigurable fabric, coordinate communication between the execution engine module and multiple data sources, and coordinate communication with an end user using one or more interactive interfaces.

In another general aspect, a system may include a routines repository which may be configured to store and maintain one or more hardware libraries, one or more software libraries and metadata and a hybrid query engine that may be configured to receive a query, parse the query, compute a query execution plan and output the query execution plan using the metadata and operators from at least one of the hardware libraries and the software libraries, where the query execution plan may be partitioned into multiple sub-execution plans. The system also may include a routines management module that may be logically coupled to the routines repository and to the hybrid query engine and that may be configured to provide the metadata and the operators from the routines repository to the hybrid query engine. The system may include an execution engine module that may be logically coupled to the hybrid query engine and that may be configured to receive the sub-execution plans. The execution engine module may include a reconfigurable hardware execution engine having a reconfigurable fabric, where the reconfigurable hardware execution engine may be configured to process one or more of the sub-execution plans, a main memory execution engine that may be configured to process one or more of the sub-execution plans, and a disc resident execution engine that may be configured to process one of the sub-execution plans. The system also may include a storage management module that may be logically coupled to the hybrid query engine and to the execution engine module and that may be configured to interact with multiple storage resources and to optimize distribution of data between the execution engine module and the multiple storage resources. The system also may include a communication management module that may be logically coupled to the execution engine module and that may be configured to coordinate communication with the reconfigurable hardware execution engine and the reconfigurable fabric, coordinate communication between the execution engine module and multiple data sources storing the data, and coordinate communication with an end user using one or more interactive interfaces.

Implementation may include one or more of the following features. For example, the hybrid query engine may include a parser that may be configured to receive the query and to check code related to the query for syntactical correctness, a rewriter that may be configured to rewrite the query into a canonical form, and an optimizer that may be configured to receive the canonical form and to generate the sub-execution plans. The optimizer may include a cost estimator that may be configured to assess a cost or alternative operators for the sub-execution plans based on the metadata provided by the routines management module and an execution planner that may be configured to construct the sub-execution plans.

The metadata stored in the routines repository may include information on operators stored in the hardware libraries and the software libraries, where the information on the operators may include performance characteristics, parameters, port bandwidths and placement constraints.

The system may include a scheduler that may be logically coupled to the hybrid query engine, the execution engine module and the routines management module. The scheduler may be configured to receive the sub-execution plans and to schedule operations on the hybrid reconfigurable execution engine, the main memory execution engine and the disc resident execution engine.

In one implementation, the storage management module may include a cache management module that may be arranged and configured to maintain consistency between a state of a database cache and a state of the database, a data access management module that may be configured to control access to the data sources that may interface with the storage management module, where the data sources may include the data, index data, data dictionary and logs, and a data migration module that may be configured to move and copy the data from one of the storage resources to another of the storage resources. The system may further include one or more cosimulation tools.

The reconfigurable hardware execution engine may further include a reconfiguration controller that may be configured to configure hardware algorithms of the operators stored in the routines repository and an execution controller that may be configured to receive and control execution of one of the sub-execution plans on the reconfigurable fabric.

In another general aspect, a method may include receiving a query, parsing the query, computing a query execution plan using metadata and operators from at least one of a hardware library and a software library, and processing the query execution plan using a reconfigurable hardware execution engine having a reconfigurable fabric.

Implementation may include one or more of the following features. For example, the method may further include partitioning the query execution plan into a first query execution plan and a second query execution plan, where processing the query execution plan may include processing the first query execution plan using the reconfigurable hardware execution engine and processing the second query execution plan using a main memory execution engine.

In another exemplary implementation, the method may further include partitioning the query execution plan into a first query execution plan and a second query execution plan, where processing the query execution plan may include processing the first query execution plan using the reconfigurable hardware execution engine and processing the second query execution plan using a disc resident execution engine.

The details of one or more implementations are set forth in the accompanying drawings and the description below. Other features will be apparent from the description and drawings, and from the claims.

DETAILED DESCRIPTION

Figure 1:
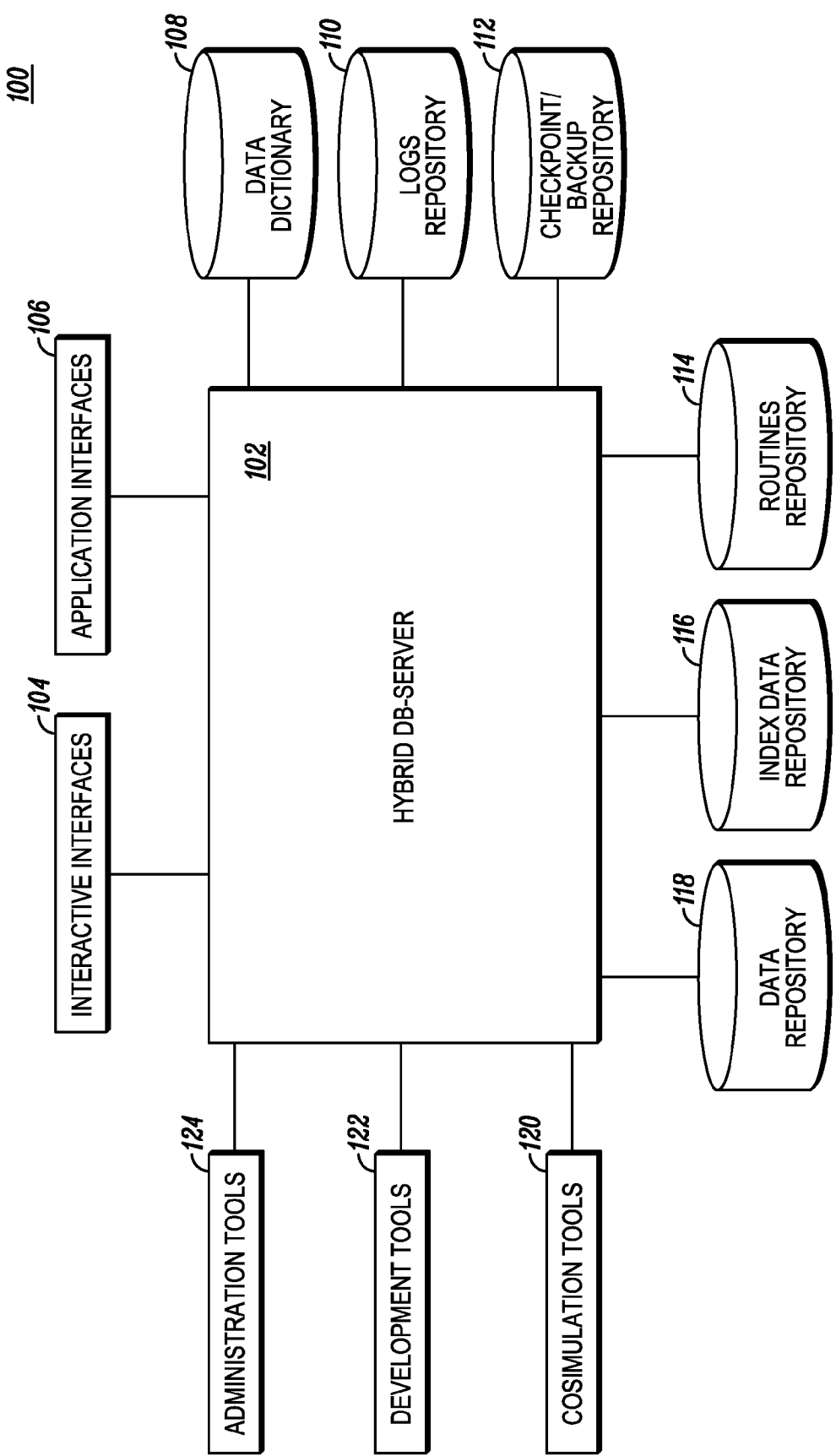
FIG. 1 is a block diagram of an exemplary hybrid database system.

Referring to FIG. 1, a hybrid database system (HYBDBS) 100 is illustrated. The HYBDBS 100 may accelerate the execution of database transactions by executing database operators (e.g., joins, scans, and sorting) implemented in hardware algorithms executed on reconfigurable computing platforms. In one exemplary implementation, the HYBDBS 100 may include a stand alone reconfigurable hardware database system (RHWDBS). In another exemplary implementation, the HYBDBS 100 may include a RHWDBS unified with a MMDBS and/or a DRDBS, thereby exploiting the strengths of all three database system technologies. Thus, the RHWDBS may be part of the HYBDBS 100, but it also may be a stand-alone system.

Reconfigurable computing may refer to operations performed on programmable hardware which may be customized by using a number of physical control points distributed over a target device. If the hardware permits, these control points can be reconfigured, i.e., programmed multiple times to adapt the functionality of the device to changing applications. Reconfigurable computing devices also may allow the settings of a subset of the available control points to be changed during the runtime of the implemented circuit, such that parts of a running application may be altered while the rest continues to operate. This manner of changing the structure and functionality of an application may be known as partial reconfiguration.

A reconfigurable computing system may include components like processors, reconfigurable fabrics, memory/caches, interfaces, and a communication network. Depending on their degree of host coupling, reconfigurable computing systems may be divided into different classes. In an ascending order of coupling degree the different classes may include the stand-alone processing unit, the attached processing unit, the co-processor, the reconfigurable functional unit (RFU) and the embedded processing unit.

By providing a selection of alternate, programmable logic and routing structures, reconfigurable computing systems may allow for rapid circuit design and implementation, thereby avoiding the up-front costs of designing custom circuits and providing a quick means of correcting design errors. The circuit may be configured onto hardware and switched into operational mode, upon which the parallelism and pipeline design style may offer considerable speedup over instruction stream processors. Reconfigurable computing systems like Field-Programmable Gate Arrays (FPGAs) facilitate system development and also may allow for easy and quick design changes and verification. FPGAs may be suitable for rapid prototyping and also may substitute for standard logic and gate array solutions in small and medium volume productions.

The HYBDBS 100 may include a hybrid database server 102, one or more interactive interfaces 104, one or more application interfaces 106, a data dictionary 108, a logs repository 110, a checkpoint/backup repository 112, a routines repository 114, an index data repository 116, a data repository 118, cosimulation tools 120, development tools 122, and administration tools 124. The hybrid database server 102 may be a core component of the HYBDBS 100. The hybrid database server 102 may include one or more components that may be configured to receive a query, parse the query and compute a query execution plan and to process the query execution plan using one or more different types of execution engines.

In one exemplary implementation, the hybrid database server 102 may include a stand-alone reconfigurable hardware execution engine that may be configured to process the query execution plan. In another exemplary implementation, the hybrid database server 102 may include multiple execution engines such as, for example, a reconfigurable hardware execution engine, a main memory execution engine, and/or a disc resident execution engine. The hybrid database server 102 is discussed below in more detail with respect to FIG. 2.

The interactive interfaces 104 may be configured to interact with an end user. For example, the interactive interfaces 104 may include a graphical user interface (GUI), a keyboard, a mouse, a touch screen, or other interactive types of interfaces that enable a user to enter information and to view information.

The application interfaces 106 may include one or more interfaces that enable the hybrid database server 102 to communicate with other external applications. For example, the application interfaces 106 may enable the hybrid database server 102 to interface with an application that enables an end user to enter a query into an application and to receive results of the query. The application interfaces 106 may support interfaces with the hybrid database server 102 and any type of application that may need to interface with such a server. For example, applications that may interface with the hybrid database server 102 may include customer applications, banking applications, medical record applications, supply chain applications, telecommunication applications, search applications, enterprise applications, and any other type of application that may interface with a database server to access data.

The data dictionary 108 may be configured to store and maintain data about the databases in the database system 100. The data dictionary 108 may store the various schema, file specifications, and their locations. The data dictionary 108 also may contain information about which programs or applications may use which data and which end users may be interested in which reports.

The logs repository 110 may include a record of transactions or activities that may take place on the HYBDBS 100. The logs repository 110 may be accessed by an end user with appropriate authorization to analyze the technical performance of the system.

The checkpoint/backup repository 112 may be configured to contain information that may describe the state of the HYBDBS 100 at a particular time. The checkpoint/backup repository 112 may include information for the systems at a particular point to enable the system to be restored from that point in the event of a failure.

The routines repository 114 may be configured to store and maintain operators in the form of hardware and software libraries, respective services, along with metadata like performance characteristics, parameters, port bandwidth, and placement constraints. The information maintained in the routines repository 114 may be used by the hybrid database server 102 to construct query execution plans. The routines repository 114 is discussed in more detail below with respect to FIG. 4.

The index data repository 116 may be configured to store and maintain information that enables the retrieval of data from the data repository 118. The index data repository 116 may include multiple lists or tables that may contain reference information pointing to data stored in the data repository 118. The data repository 118 may include the data for the database contents. The data repository 118 may store and maintain the data that is being requested by an end user through the interactive interfaces 104 and the application interfaces 106 using the hybrid database server 102.

The cosimulation tools 120 may be configured to enable simulation scenarios to be run on the HYBDBS 100. The cosimulation tools 120 may include one or more applications that may cause the HYBDBS 100 to respond mathematically to data and changing conditions as though it was the process running itself.

The development tools 122 may be configured to enable a developer to make changes to the HYBDBS 100 and to the hybrid database server 102. The development tools 122 may include one or more applications having one or more routines to enable developers to write programs and/or to make changes to the HYBDBS 100.

The administration tools 124 may be configured to enable an end user with administrative rights to maintain the HYBDBS 100 in operating condition.

Figure 2:
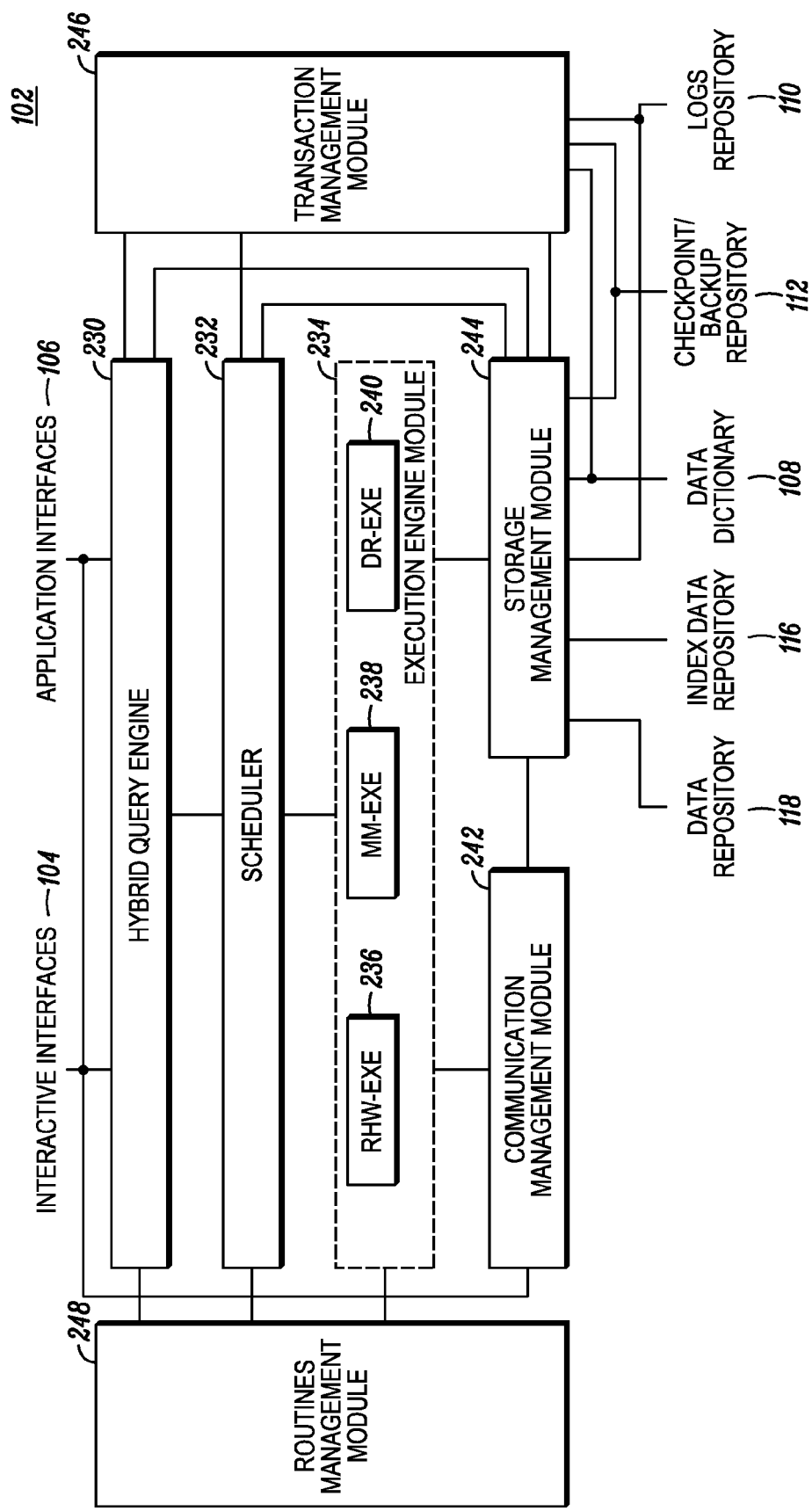
FIG. 2 is a block diagram of an exemplary hybrid database server.

Referring to FIG. 2, a block diagram of the hybrid database server 102 is illustrated. The hybrid database server 102 may include a hybrid query engine 230, a scheduler 232 and an execution engine module 234. The execution engine module 234 may include a reconfigurable hardware execution engine 236, a main memory execution 238 and a disc resident execution engine 240. The hybrid database server 102 may include a communication management module 242, a storage management module 244, a transaction management module 246, and a routines management module 248.

The hybrid query engine 230 may be logically coupled to the interactive interfaces 104 and the application interfaces 106. The hybrid query engine 230 also may be logically coupled to the scheduler 232, the storage management module 244, the transaction management module 246 and the routines management module 248.

The hybrid query engine 230 may be configured to receive a query, parse the query, compute a query execution plan and output the query execution plan using the metadata and operators from at least one of the hardware libraries and the software libraries. The metadata and the operators from the hardware libraries and the software libraries may be accessed from the routines repository 114 using the routines management module 248. For example, an end user may enter a query using the interactive interfaces 104 and an application through the application interfaces 106. The query may be in different forms including, for example, structured query language (SQL). The received query may be parsed, re-written and optimized by the hybrid query engine 230. The hybrid query engine 230 may compute and output a query execution plan.

In one exemplary implementation, the query execution plan may be partitioned into individual execution plans, which may be referred to as sub-execution plans. The sub-execution plans may be tailored for respective different execution engines within the execution engine module 234. For example, one sub-execution plan may be computed for the reconfigurable hardware execution engine 236, another sub-execution plan may be computed for the main memory execution engine 238, and another sub-execution plan may be computed for the disc resident execution engine 240.

The query execution plan and the respective sub-execution plans may be in the format of different types of data structures. In one exemplary implementation, one data structure for the representation of the execution query plan may be a data flow graph. The nodes in such a data flow graph may represent operator descriptors whereas the arcs may indicate the flow of data. The hybrid query engine 230 is described below in more detail with respect to FIG. 3.

The scheduler 232 may be logically coupled to the hybrid query engine 230 and to the routines management module 248. This scheduler also may be logically coupled to the execution engine module 234, the transaction management module 246, and the storage management module 244.

The scheduler 232 may be configured to receive the query execution plan from the hybrid query engine 230 and to schedule operations for one or more of the execution engines with the execution engine module 234. For example, in a stand-alone system using just the reconfigurable hardware execution engine 236, the scheduler 232 may plan and schedule operations just for the reconfigurable hardware execution engine 236. In other exemplary implementations, that include multiple execution engines, the scheduler 232 may be configured to schedule operations for each of the engines including, for example, the reconfigurable hardware execution engine 236, the main memory execution engine 238 and the disc resident execution engine 240.

The scheduler 232 may receive the query execution plan, which also may contain the interdependencies between the sub-execution plans. For example, a database operation in the sub-execution plan for the reconfigurable hardware execution engine 236 may need to wait for the completion of database operations that are being executed by the main memory execution engine 238 and/or the disc resident execution engine 240. The scheduler 232 may decide at which time the various operations may have to be started on the execution engines. The scheduler 232 also may maintain a queue of incoming query execution plans which may be served according to chosen scheduling policies and depending on parameters such as, for example, priorities, due dates, expected execution duration (if known), and other parameters.

The execution engine module 234 may be logically coupled to the scheduler 232, the routines management module 248, the communications management module 242 and the storage management module 244. The execution engine module 234 may be configured to receive the query execution plan, including any sub-execution plans. The execution engines such as, for example, the reconfigurable hardware execution engine 236, the main memory execution engine 238, and the disc resident execution engine 240 may be configured to execute and process the query execution plan and respective sub-execution plans as may be assigned by the scheduler 232.

The main memory execution engine 238 may be implemented, for example, by execution engines such as those used in eXtremeDB by McObject or CSQL (open source). The disc resident execution engine 240 may be implemented, for example, by execution engines such as those used in OpenOffice.org Base by Sun Microsystems or DB2 by IBM. The reconfigurable hardware execution engine 236 may include a reconfigurable fabric along with placement, routing and control components. After allocating a free partition on the reconfigurable fabric, the circuitry for the database operations may be placed and interconnect for data communications and control may be routed. The reconfigurable hardware execution engine 236 may then be configured to process the query execution plan and/or its respective sub-execution plan. The reconfigurable hardware execution engine 236 is described in more detail below with respect to FIG. 5.

The communication management module 242 may be logically coupled to the execution engine module 234, the storage management module 244, the interactive interfaces 104 and the application interfaces 106. The communication management module 242 may be configured to coordinate communication with the execution engine module 234, coordinate communication between the execution engine module 234 and multiple data sources (e.g., data repository 118), and coordinate communication with an end user using one or more interactive interfaces 104 and/or application interfaces 106.

In one exemplary implementation, the communication management module 242 may be configured to coordinate communications with the reconfigurable hardware execution engine 236 and the reconfigurable fabric. A dynamic signal switching communication architecture, which may be referred to as Reconfigurable Multiple Bus, may be used for the communication within the reconfigurable fabric. The functionality of the communication management module 242 may be partitioned into software and reconfigurable hardware.

The storage management module 244 may be logically coupled to the communication management module 242, the execution engine module 234, the scheduler 232, the hybrid query engine 230, and the transaction management module 246. The storage management module 244 also may be coupled with the data repository 118, the index data repository 116, the data dictionary 108, the checkpoint/backup repository 112 and the logs repository 110.

The storage management module 244 may be configured to interact with multiple storage resources and to optimize distribution of data between the execution engine module 234 and the multiple storage resources. The storage management module 244 may control access to the various data sources such as, for example, the data repository 118, the index data repository 116, the data dictionary 108, the checkpoint/backup repository 112, and the logs repository 110. The storage management module 244 is described in more detail below with respect to FIG. 6.

The transaction management module 246 may be logically coupled to the hybrid query engine 230, the scheduler 232, and the storage management module 244. The transaction management module 246 also may be logically coupled to the data dictionary 108, the checkpoint/back repository 112, and the logs repository 110.

The transaction management module 246 may be configured to determine whether or not transactions are either carried out successfully or have failed. The transaction management module 246 may be configured to ensure that a transaction does not terminate in an intermediate state. The transaction management module 246 may be responsible for transaction processing tasks such as logging, controlling access to data using lock mechanisms, check-pointing, backup, and rollback.

The routines management module 248 may be logically coupled to the hybrid query engine 230, the scheduler 232, and the execution engine module 234. The routines management module 248 may be configured to provide the metadata and the operators from the routines repository 118 to the hybrid query engine 230. The routines management module 248 is described in more detail below with respect to FIG. 4.

The use of the hybrid data server 102 may offer potential speedup over traditional sequential execution on instruction stream processors. The potential speedup may result from executing the database operators as circuits on the reconfigurable fabric. The reconfigurable fabric may enable placing data operator circuits close to embedded memory in the form of, for example, block random access memory (RAM), lookup table RAM and other types of memory, which may further reduce data access times. As a consequence of the accelerated and more predictable execution speeds offered by the hybrid database server 102, constraints may be reliably met in real-time scenarios.

The HYBDBS 100 enables for offloading computationally expense operations into hardware algorithms. Due to the parallelization and pipelining of database operations and hardware, transactions may be completed faster such that locks may be released earlier and the chance of lock contention may be reduced. Furthermore, in the reconfigurable hardware database, it may be more beneficial to use larger lock granules than in other types of database systems. Consequentially, the cost for concurrency control may be reduced or, in the extreme case, even be completely eliminated (e.g., by locking the entire database). Also, less transactions may need to be suspended such that less cache flushes may be needed, which can be very time-consuming on database systems.

In one exemplary implementation, the hybrid database server 102 may be used in the mapping of radar signatures of moving objects against the database, or processing and correlating event streams or trading of securities. For example, the hybrid database server 102 may be used to discover trading opportunities before they disappear. The pipeline design style may process data with a higher throughput and may therefore allow for satisfying real-time constraints which previously could not have been met by database systems on instruction stream processors.

In another exemplary implementation, the hybrid database server 102 may be used in high-performance analytics and the transformation of database objects. For example, on the reconfigurable hardware execution engine 236, not only database operators may be implemented in hardware but they can also be combined with circuits for analyzing or transforming database objects and streams. Hence, audio and video data may be filtered and processed on the fly, and confidential data may be encrypted and/or decrypted.

In other exemplary implementations, the integrated hybrid database system, HYBDBS 100, may partition the execution and storage of data according to the data characteristics to best exploit the strengths of the various database technologies. Data characteristics or data types may include hot data, which may include data that typically has a low storage volume, high access frequencies and stringent timing constraints and cold data, which may include data that typically has a high storage volume, low access frequencies and no or only soft time constraints. Thus, hot data may preferably be processed in the reconfigurable hardware execution engine 236 and the cold data may be processed using the disc resident execution engine 240. The main memory execution engine 238 may be chosen for the processing of data in the mid of the range between hot data and cold data.

For example, in the telecommunications sector routing, routing table and telephone switching applications may be considered hot data and thus, should be processed in the reconfigurable hardware execution engine 236. On the other hand, monthly customer billing may be considered cold data and more appropriately processed using the disc resident execution engine 240.

In another exemplary implementation, the banking industry may include account records that are considered hot data and therefore appropriately processed using the reconfigurable hardware execution engine 236. Whereas, historical data of previous banking activity or personal records like address or date of birth may be considered cold data and more appropriately processed using the disc resident execution engine 240 and/or the main memory execution engine 238.

The HYBDBS 100 also may adapt to changing data characteristics. For example, the HYBDBS 100 may adapt to an increased access frequency by appropriately migrating data. For example, data may appropriately be migrated from discs to embedded memory blocks.

Figure 3:
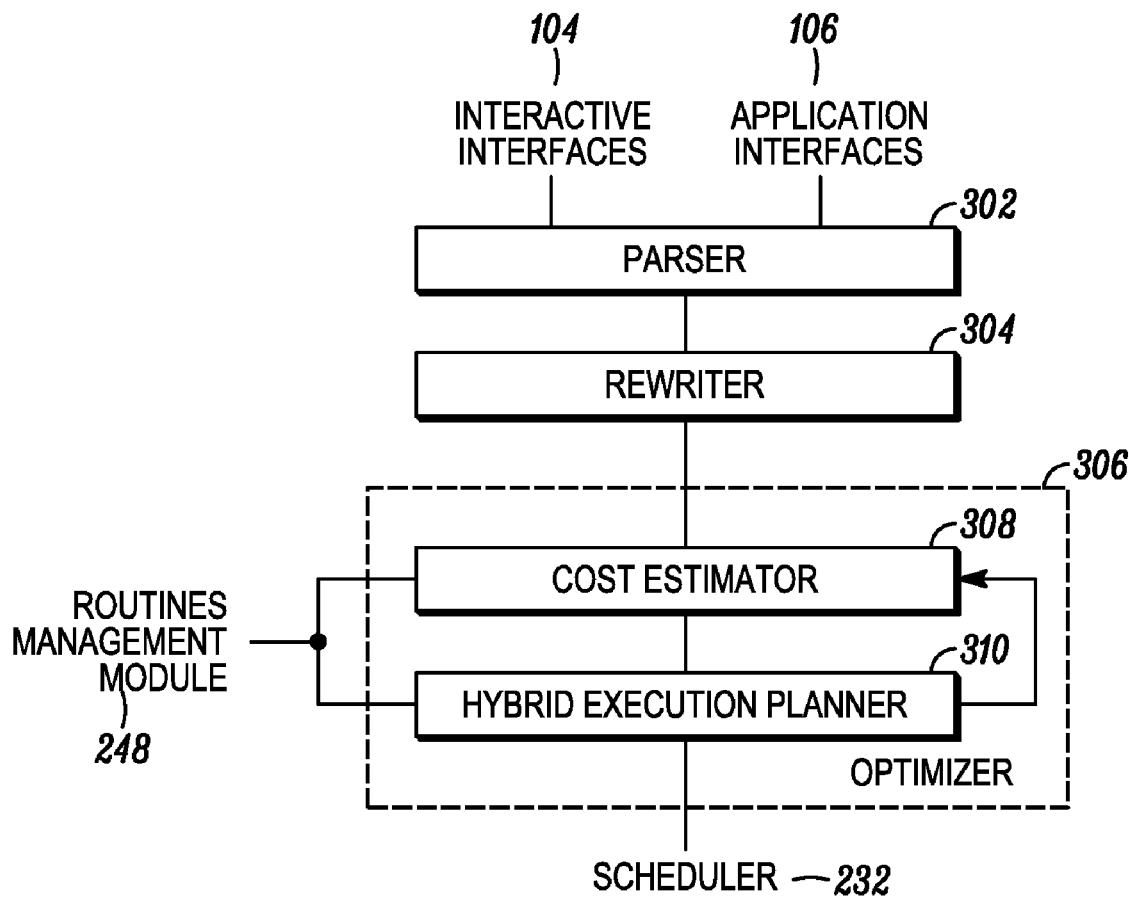
FIG. 3 is a block diagram of an exemplary hybrid query engine.

Referring to FIG. 3, a block diagram of the hybrid query engine 230 is illustrated. The hybrid query engine 230 may include a parser 302, a rewriter 304, and an optimizer 306. The optimizer may include a cost estimator 308 and a hybrid execution planner 310.

The parser 302 may be logically coupled to the interactive interfaces 104 and to the application interfaces 106. Queries, for example, in the form of SQL, may be received by the parser 302. The parser 302 may be configured to check the code related to the received queries for syntactical correctness. The rewriter 304 may be configured to rewrite the query into a canonical form. In one exemplary implementation, the parser 302 and the rewriter 304 may include the parser and rewriter technologies used for example in, PostgreSQL DBMS.

The optimizer 306 may be configured to receive the re-written code and to generate a query execution plan. The query execution plan may be partitioned into sub-execution plans for the respective different target execution engines within the execution engine module 234. A data flow graph may be chosen as a data structure representing such a query execution plan, where the nodes may correspond to operator descriptors and the arcs may indicate the flow of data. In particular, the optimizer 306 may be configured to decide on the specific implementation of the nodes. For example, the nodes may include nested loop join, hash join, merged join, sequential scan, or index scan.

The optimizer 306 may include a cost estimator 308. The cost estimator 308 may be configured to give an assessment of the cost for the alternative operators for the query execution plan and/or the sub-execution plans. The cost may be expressed in terms of, for example, the expected runtime or consumption of chip area on the reconfigurable fabric. Cost estimations for the operators (e.g., operators that may be implemented in hardware and/or software) may be based on the metadata stored in the routines repository 114. A cost estimator 308 may retrieve information from the data dictionary 108 to provide input regarding the cardinality of table structured of the relations, statistics of the results in previous executions, relations between tables, and attributes for which there exists an index.

The optimizer 306 may include the hybrid execution planner 310. The hybrid execution planner 310 may be configured to construct the query execution plan. The hybrid execution planner 310 may perform modifications to existing query execution plans, which then may be reassessed by the cost estimator 308. This may be an iterative process, as indicated by the loop within the optimizer 306, which may be repeated until certain stopping conditions may be met. For example, the process may be repeated until a maximum number of iterations has been reached or no cost reduction greater than 1% has been reached during the last 10 iterations. The hybrid execution planner 310 may be configured to create a partitioning of the query execution plan for the three types of execution engines by choosing the database operators from the routines repository 114 and guidance from the associated cost estimates provided by the cost estimator 308. Thus, the query execution plan may include the respective sub-execution plans together with dependencies between them. The query execution plan may be forwarded to the scheduler 232.

Figure 4:
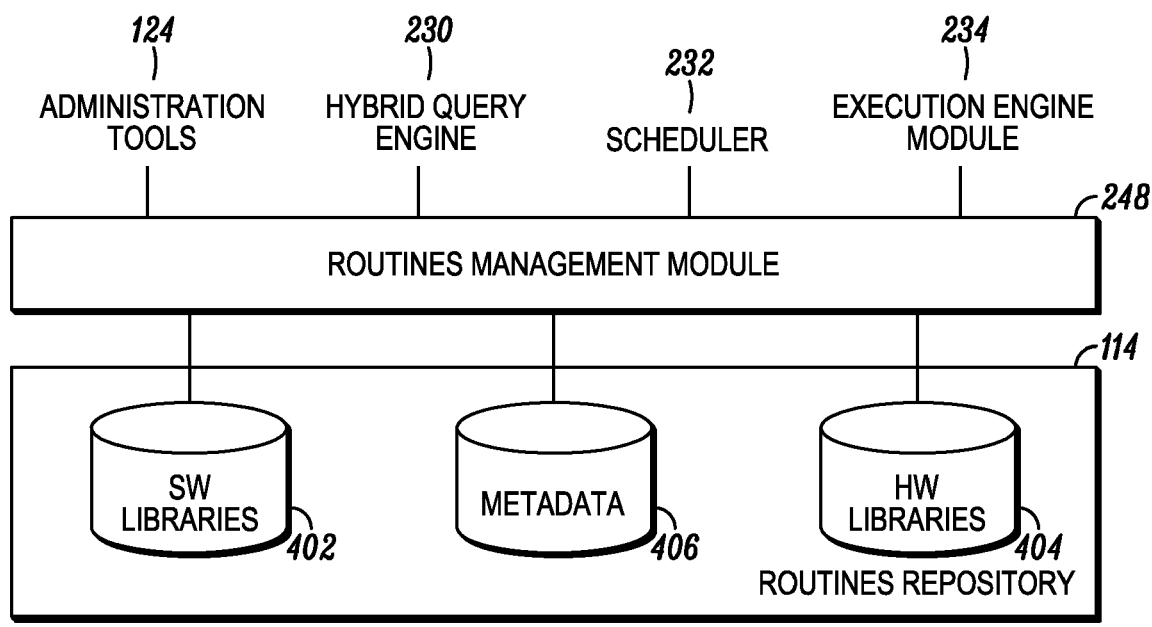
FIG. 4 is a block diagram of an exemplary routines repository and management.

Referring to FIG. 4, a block diagram of the routines repository 114 and the routines management module 248 is illustrated. The routines repository 114 may be logically coupled to the routines management module 248. The routines repository 114 may include software libraries 402, hardware libraries 404, and metadata 406.

The software libraries 402 and the hardware libraries 404 may contain the definitions, implementations or executables of operators such as, for example, database operators or data type conversion. Database operators may include, for example, executable code for nested joins or index scans.

The software libraries 402 may include the operators executed on central processing units (CPUs), in particular for the main memory execution engine and the disc resident execution engine. The hardware libraries 404 may include the operators which can be loaded and executed on the reconfigurable fabric. For example, the operators contained in the hardware libraries 404 may be used by the reconfigurable hardware execution engine 236.

In one exemplary implementation, the circuitry may be described, for example, in the form of IP cores that may be configured using a set of parameters (e.g., width of input and output ports, type of algorithms, and synchronous or asynchronous timing). An IP core may be a block of logic or data that is used in making a field programmable gate array or application-specific integrated circuit for a product. An IP core may be provided as a generic gate netlist. The circuitry also may be described in terms of pre-synthesized library modules, configurable code described in either hardware description languages (e.g., VHDL or Verilog) or higher-level hardware-oriented programming languages (e.g., SystemC or Handel-C).

The metadata 406 may include information on the operators stored in the software libraries 402 and the hardware libraries 404. For example, the metadata may include performance characteristics, needed parameters, port bandwidths, and placement constraints. The metadata 406 may be used by the hybrid query engine 230 and the execution engines within the execution engine module 234.

The routines management module 248 may be logically coupled to the routines repository 114. The routines management module 248 also may be logically coupled to the administration tools 124, the hybrid query engine 230, the scheduler 232, and the execution engine module 234.

The routines management module 248 may be configured to receive and process inquiries from the hybrid database server 102. For example, the routines management module 248 may receive a query such as "provide a list of nested loop circuitries for given port widths and a given maximum amount of utilized configurable logic blocks." The routines management module 248 may provide an administration interface which allows for example, an end user to view and delete operators, include new operators, or to edit the metadata 406.

Figure 5:
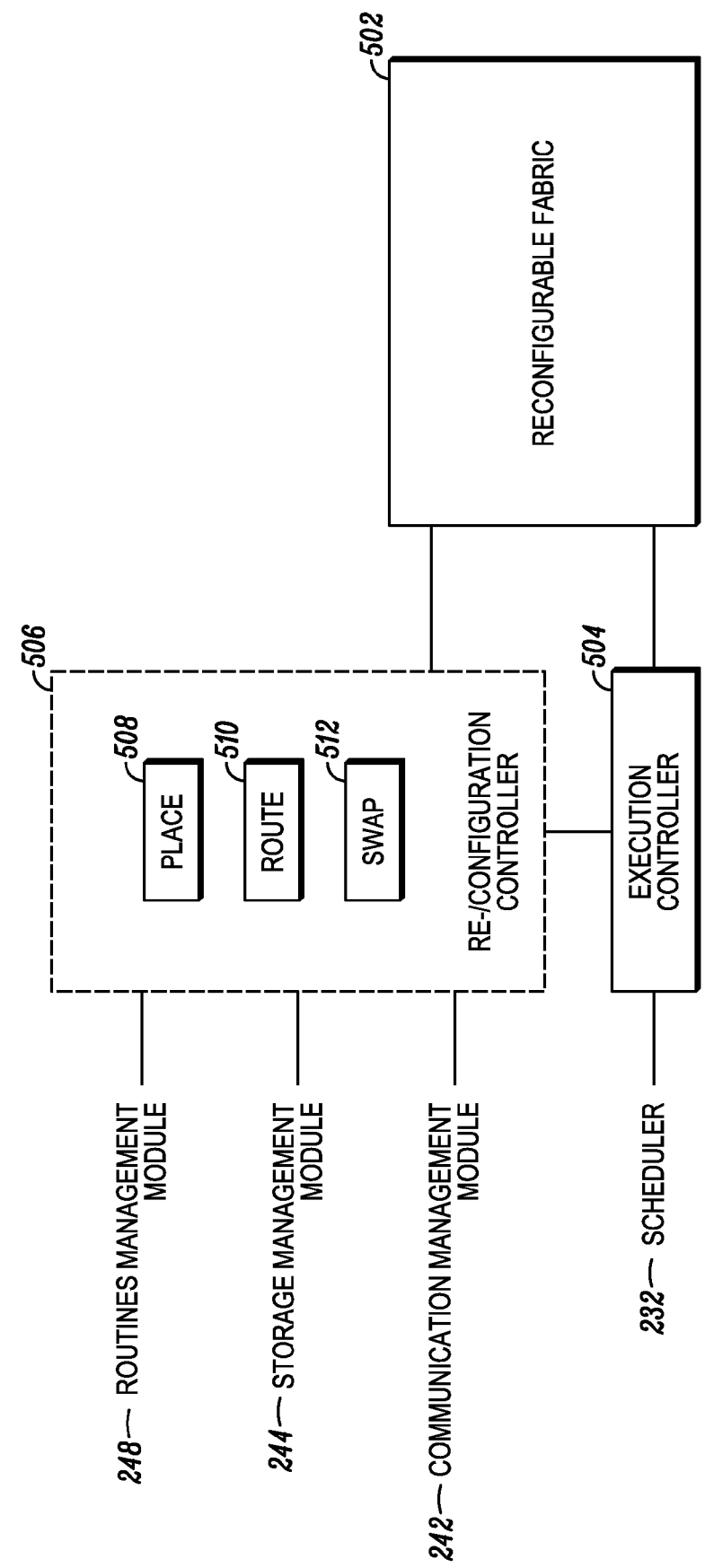
FIG. 5 is a block diagram of an exemplary reconfigurable hardware execution engine.

Referring to FIG. 5, a block diagram of the reconfigurable hardware execution engine 236 is illustrated. The reconfigurable hardware execution engine 236 may include the reconfigurable fabric 502, an execution controller 504, and a re-/configuration controller 506.

The reconfigurable fabric 502 may include the actual circuitry for the database operations. This circuitry may be implemented using parallelism and pipelining capabilities that enable the acceleration of the execution of database operations. The reconfigurable fabric 502 may enable reconfiguration at runtime, faster execution, and/or reduced power consumption. The use of the reconfigurable fabric 502 may enable new algorithmic techniques, which may accelerate the application by transferring certain operations into the structure of the reconfigurable logic and routing resources. In one exemplary implementation, FPGAs, may be used in the reconfigurable fabric 502. In one exemplary implementation, an Erlangen Slot Machine (ESM) may be used.

The execution controller 504 may be logically coupled to the scheduler 232. The execution controller 504 may receive the query execution plan from the scheduler 232. For example, if the data structure of the query execution plan is a data flow graph, then the execution controller 504 may receive the data flow graph together with timing constraints. The execution controller 504 may be configured to arrange and control the execution of the query execution plan on the reconfigurable fabric 502.

The re-/configuration controller 506 may be configured to configure the hardware algorithms of the database operators stored in the routines repository 114, which may be received using the routines management module 248. The configuration of the hardware modules comprises placement 508 and routing 510. Routing may have to be established for innermodule, inter-module and external communication using the storage management module 244 and the communication management module 242. When possible, some portions of the configured fabric may be re-configured by swapping out 512 the current configuration data and swapping in the configuration data for the new operators to be loaded. In this manner, this may be referred to as partial re-configuration. Such re-configuration may be needed, for example, if the chip device is too small to fit all the operators at the same time.

Re-configuration also may be used to de-fragment the chip area to generate enough consecutive free space to configure a database operator.

Figure 6:
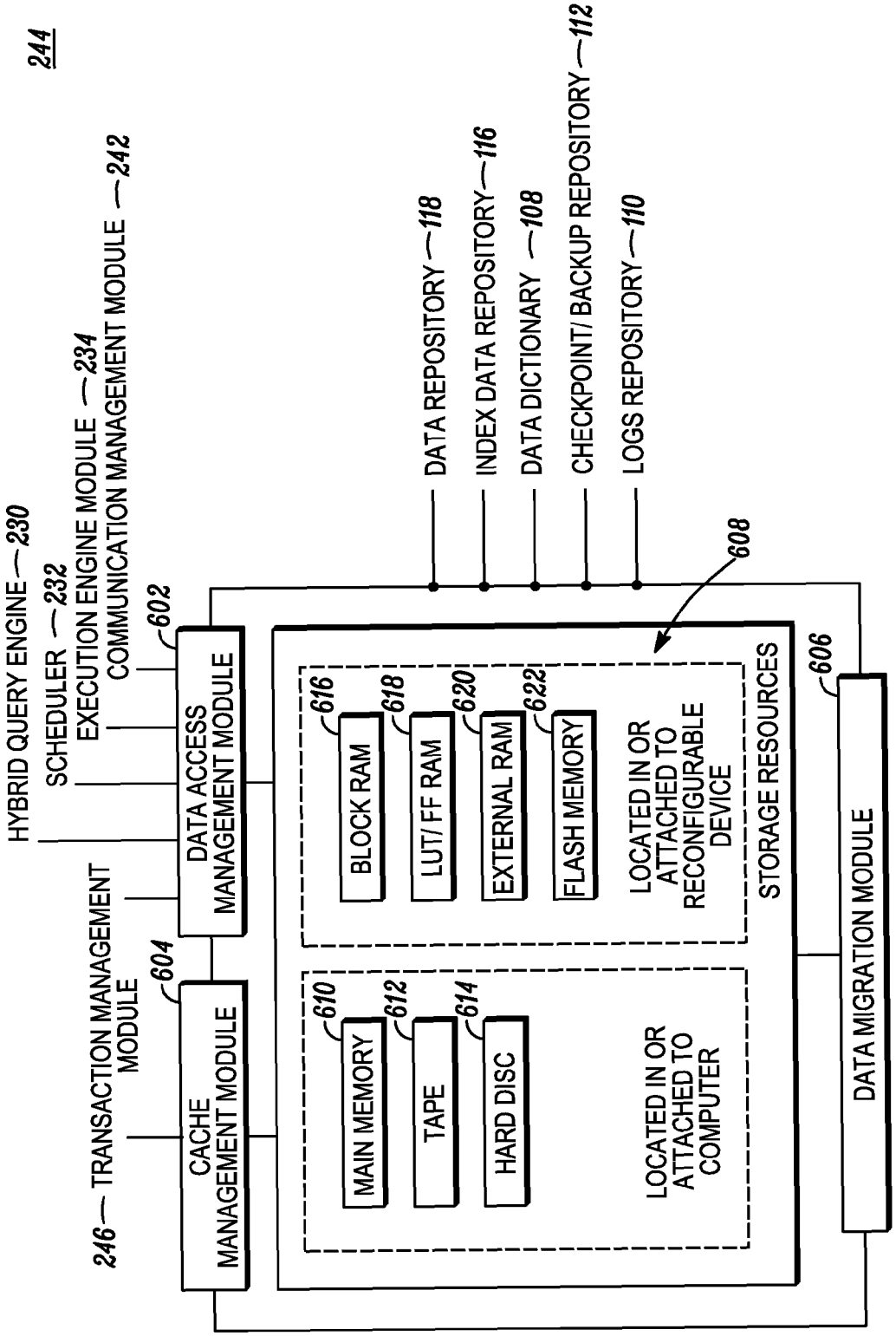
FIG. 6 is a block diagram of an exemplary storage management component.

Referring to FIG. 6, the storage management module 244 is illustrated. The storage management module 244 may include a data access management module 602, a cache management module 604, and a data migration module 606. The storage management module 244 may be configured to interact with multiple storage resources 608 and to optimize distribution of data between the execution engine module 234 and the multiple storage resources 608. The storage management module 244 may include logical couplings to the transaction management module 246, the hybrid query engine 230, the scheduler 232, the execution engine module 234, communications management module 242, data repository 118, index data repository 116, data dictionary 108, checkpoint/backup repository 112 and logs repository 110.

The storage resources 608 may include different types of storage resources. For example, the storage resources 608 may include resources located in or attached to the computer such as, for example, main memory 610, tape 612, and hard disc 614. Storage resources 608 also may include storage resources that may be located in or attached to the reconfigurable device such as, for example, block RAM 616, look-up tables/flip-flop RAM 618, external RAM 620 and flash memory 622. The storage resources 608 may be considered primary, secondary, and/or tertiary storage resources.

The data access management module 602 may be configured to control access to data sources such as table contents, index data repository 116, data dictionary 108, checkpoint/backup repository 112, and logs repository 110. In the case the data needs to be read or modified, the transaction management module 246 may make a call to the data access management module 602, which may identify the location where the needed data may be stored as close as possible to the execution engine processing this data. In this context, data is the "closer" the higher the expected throughput between storage device and processing device. However, certain constraints may need to be fulfilled. For example, the main memory execution engine 238 may need to access memory which can be address directly (e.g., main memory 610, or external RAM 620 on the reconfigurable platform). Reconfigurable hardware execution engine 236 may make use of memory residing internally in the reconfigurable fabric (e.g., block RAM 616 or LUT/FF RAM 618). The disc resident execution engine 240 may use data stored on discs or in the database cache.

The data migration module 606 may be configured to satisfy constraints or to increase the expected data throughput between storage and processing device. The data migration module 606 may be configured to move or copy data from one of the storage resources to another storage resource. For example, the main memory execution engine 238 may need data which is stored only on disc. In this situation, the data migration module 606 may copy the required data from discs to main memory 610 to enable the main memory execution engine 238 to access the needed data.

In another example, the reconfigurable hardware execution engine 236 may need data which may only be stored in the main memory 610. In this example, the data migration module 606 may invoke a copy of the corresponding data into internal block RAM 616 to allow for higher throughput.

In yet another example, the computational results may be stored in external RAM 620 and may be appended to a table stored on disc. In this example, the data migration module 606 may transfer the respective data to the disc resident execution engine 240 which may in turn perform the database operation to append rows to tables stored on disc.

The cache management module 604 may be configured to cooperate with the transaction management module 246 to maintain consistency between the state of the database cache and the state in the database. In this manner, data that may be in the database cache may be written to a more persistent database portion.

Figure 7:
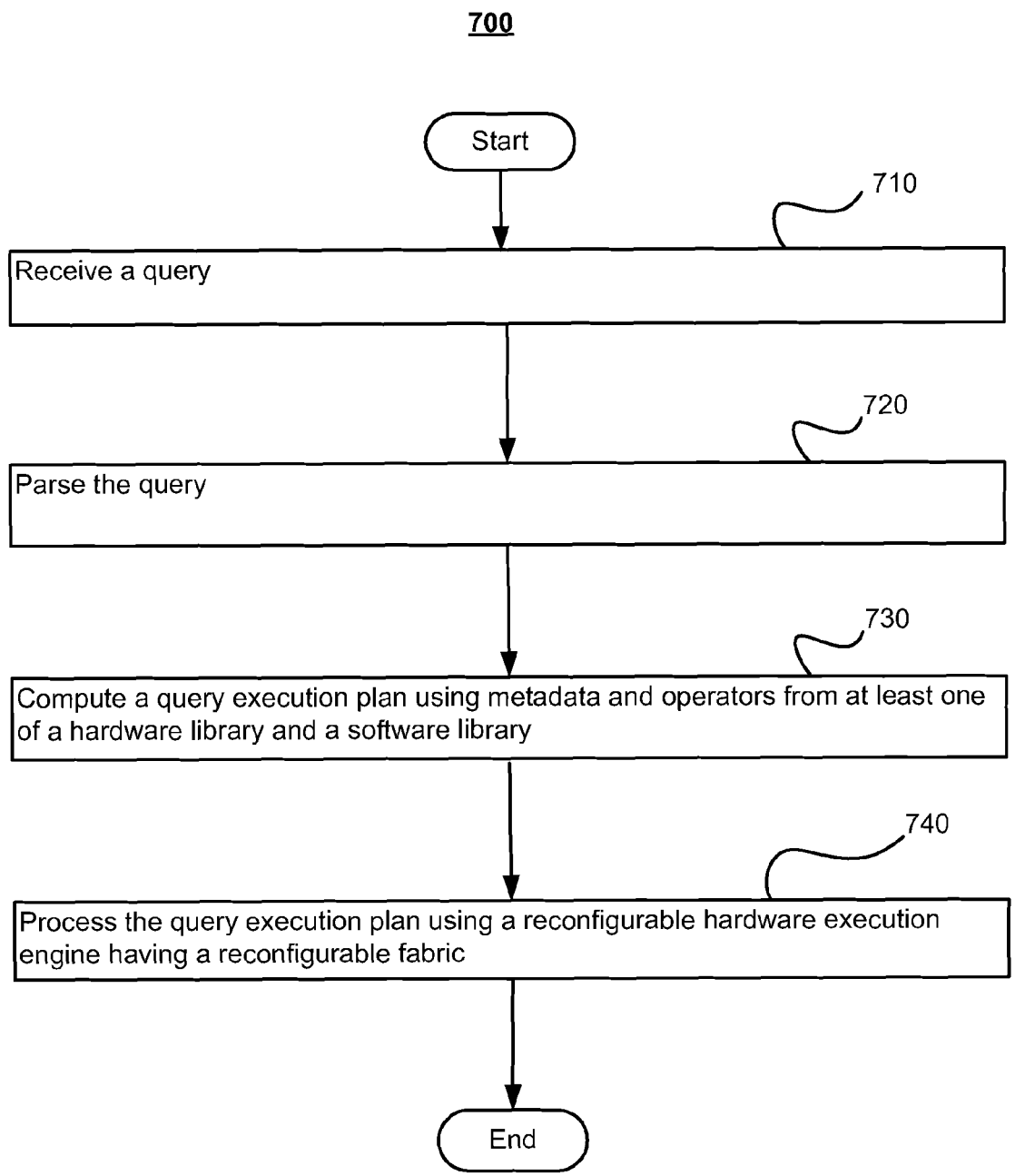
FIG. 7 is a flowchart illustrating example operations of the system of FIGS. 1 and 2.

Referring to FIG. 7, process 700 illustrates example operations of the system of FIGS. 1 and 2. Process 700 may include receiving a query (710), parsing the query (720), computing a query execution plan using metadata and operators from at least one of a hardware library and a software library (730) and processing the query execution plan using a reconfigurable hardware execution engine having a reconfigurable fabric (740).

In one exemplary implementation, the hybrid query engine 230 may be configured to receive the query (710), parse the query (720) and compute the query execution plan (730). The reconfigurable hardware execution engine 236 may be configured to process the query execution plan (740).

Process 700 may further include partitioning the query execution plan into multiple sub-execution plans. For example, the hybrid query engine 230 may be configured to partition the query execution plan into multiple sub-execution plans. In one exemplary implementation, the reconfigurable hardware execution engine 236 may process one of the sub-execution plans, the main memory execution engine 238 may process one of the sub-execution plans and/or the disc resident execution engine 240 may process one of the sub-execution plans.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    a routines repository that is arranged and configured to store and maintain one or more hardware libraries, one or more software libraries and metadata;
    a hybrid query engine that is arranged and configured to receive a query, parse the query, compute a query execution plan and output the query execution plan using the metadata and operators from at least one of the hardware libraries and the software libraries, wherein the query execution plan is partitioned into multiple sub-execution plans;
    a routines management module that is logically coupled to the routines repository and to the hybrid query engine and that is arranged and configured to provide the metadata and the operators from the routines repository to the hybrid query engine;
    an execution engine module that is logically coupled to the hybrid query engine and that is arranged and configured to receive the sub-execution plans, the execution engine module comprising:
        a reconfigurable hardware execution engine, wherein the reconfigurable hardware execution engine is arranged and configured to process one of the sub-execution plans and the reconfigurable hardware execution engine comprises:
            a reconfigurable fabric,
            a reconfiguration controller that is configured to configure hardware algorithms of operators stored in the routines repository, and
            an execution controller that is configured to receive and control execution of one of the sub-execution plans on the reconfigurable fabric;
        a main memory execution engine that is arranged and configured to process one of the sub-execution plans; and
        a disc resident execution engine that is arranged and configured to process one of the sub-execution plans;
    a storage management module that is logically coupled to the hybrid query engine and to the execution engine module and that is arranged and configured to interact with multiple storage resources and to optimize distribution of data between the execution engine module and the multiple storage resources; and
    a communication management module that is logically coupled to the execution engine module and that is arranged and configured to:
        coordinate communication with the reconfigurable hardware execution engine and the reconfigurable fabric;
        coordinate communication between the execution engine module and multiple data sources storing the data; and
        coordinate communication with an end user using one or more interactive interfaces.

2. The system of claim 1 wherein the hybrid query engine comprises:
    a parser that is arranged and configured to receive the query and to check code related to the query for syntactical correctness;
    a rewriter that is arranged and configured to rewrite the query into a canonical form; and
    an optimizer that is arranged and configured to receive the canonical form and to generate the sub-execution plans.

3. The system of claim 2 wherein the optimizer comprises:
    a cost estimator that is arranged and configured to assess a cost for alternative operators for the sub-execution plans based on the metadata provided by the routines management module; and
    an execution planner that is arranged and configured to construct the sub-execution plans.

4. The system of claim 1 wherein the metadata stored in the routines repository includes information on operators stored in the hardware libraries and the software libraries, wherein the information on the operators includes performance characteristics, parameters, port bandwidths and placement constraints.

5. The system of claim 1 further comprising:
    a scheduler that is logically coupled to the hybrid query engine, the execution engine module and the routines management module and that is arranged and configured to receive the sub-execution plans and to schedule operations on the hybrid reconfigurable execution engine, the main memory execution engine and the disc resident execution engine.

6. The system of claim 1 wherein the storage management module comprises:
    a cache management module that is arranged and configured to maintain consistency between a state of a database cache and a state of the database;
    a data access management module that is arranged and configured to control access to the data sources that interface with the storage management module, wherein the data sources include the data, index data, data dictionary and logs; and a data migration module that is arranged and configured to move and copy the data from one of the storage resources to another of the storage resources.

7. The system of claim 1 further comprising one or more cosimulation tools.

8. A method comprising:

receiving a query;

parsing the query;

computing a query execution plan using metadata and operators from at least one of a hardware library and a software library;

partitioning the query execution plan into multiple sub-execution plans;

processing the sub-execution plans using one or more of a reconfigurable hardware execution engine, a main memory execution engine and a disc resident execution engine, where the reconfigurable hardware execution engine includes a reconfigurable fabric by configuring hardware algorithms of operators stored in a repository and controlling one of the sub-execution plans on the reconfigurable fabric;

optimizing distribution of data between the execution engines and multiple storage resources;

coordinating communication with the reconfigurable hardware execution engine and the reconfigurable fabric;

coordinating communication between the execution engines and the multiple data sources storing the data; and coordinating communication with an end user using one or more interactive interfaces.

9. The method as in claim 8 further comprising:

receiving the query and checking code related to the query for syntactical correctness;

rewriting the query into a canonical form; and receiving the canonical form and generating the sub-execution plans.

10. The method as in claim 9 further comprising:

assessing a cost for alternative operators for the sub-execution plans based on the metadata; and constructing the sub-execution plans.

11. The method as in claim 8 wherein the metadata includes information on operators stored in the hardware libraries and the software libraries, wherein the information on the operators includes performance characteristics, parameters, port bandwidths and placement constraints.

12. The method as in claim 8 further comprising scheduling operations on the hybrid reconfigurable execution engine, the main memory execution engine and the disc resident execution engine.

13. The method as in claim 8 further comprising:

maintaining consistency between a state of a database cache and a state of the database;

controlling access to the data sources, wherein the data sources include the data, index data, data dictionary and logs; and moving and coping the data from one of the storage resources to another of the storage resources.

\* \* \* \* \*